United States Patent [19]

Akiyama et al.

[11] Patent Number: 4,647,716
[45] Date of Patent: Mar. 3, 1987

[54] ARTICLE HAVING HEAT EXPANDABLE SEALING MEMBER

[75] Inventors: James K. Akiyama, Mountain View; Klaus D. Freysing, San Jose; Richard A. Young, Cupertino, all of Calif.

[73] Assignee: Sigmaform Corporation, Santa Clara, Calif.

[21] Appl. No.: 668,740

[22] Filed: Nov. 6, 1984

[51] Int. Cl.[4] .......................... H02G 15/04; F16B 4/00
[52] U.S. Cl. ..................................... 174/77 R; 156/52; 156/79; 156/86; 174/110 F; 174/DIG. 8; 264/46.6; 264/46.7; 264/46.9; 264/230; 264/DIG. 71; 403/273
[58] Field of Search ................. 174/77 R, DIG. 8, 87; 169/48; 264/46.6, 46.7, 46.9, 230, 271.1, 272.11, DIG. 71; 156/79; 277/1; 285/381, 909; 403/273, 393, 396

[56] References Cited

U.S. PATENT DOCUMENTS

| 2,186,793 | 1/1940 | Wodtke | 174/110 F |
|---|---|---|---|
| 2,466,271 | 4/1949 | Pfleumer | 174/110 F |
| 3,864,883 | 2/1975 | McMarlin | 169/48 X |
| 3,985,951 | 10/1976 | Harris | 174/138 F |
| 4,083,902 | 4/1978 | Clyde | 174/77 R |
| 4,095,044 | 6/1978 | Horsma et al. | 174/DIG. 8 |
| 4,105,481 | 8/1978 | Lofdahl | 174/DIG. 8 |
| 4,195,106 | 3/1980 | Brusselmans | 174/DIG. 8 X |
| 4,241,234 | 12/1980 | Haeder | 174/DIG. 8 X |
| 4,266,687 | 5/1981 | Cummings | 220/257 |
| 4,298,415 | 11/1981 | Nolf | 156/85 |
| 4,434,320 | 2/1984 | Klein et al. | 174/77 R X |
| 4,456,784 | 6/1984 | Klein | 174/77 R X |

FOREIGN PATENT DOCUMENTS

| 555578 | 4/1958 | Canada | 174/110 F |
|---|---|---|---|
| 0079245 | 11/1982 | European Pat. Off. . | |
| 0120437 | 3/1984 | European Pat. Off. . | |
| 0153174 | 2/1985 | European Pat. Off. . | |
| 2413623 | 10/1975 | Fed. Rep. of Germany . | |
| 2369712 | 10/1977 | France . | |

Primary Examiner—Arthur T. Grimley
Assistant Examiner—Morris H. Nimmo
Attorney, Agent, or Firm—Limbach, Limbach & Sutton

[57] ABSTRACT

An article comprising a generally axially extending outer, tubular member, a plurality of generally axially extending cylindrical members, and a heat expandable foam sealing member. The outer tubular member has at least one opening and occupies a predetermined volume. Each of the cylindrical members is received by outer tubular member in an axially extending, parallel fashion such that the cylindrical members occupy a volume that is less than the volume of the outer tubular member. The sealing member, capable of sealing the opening of outer tubular member, occupies a volume that is generally equal to the difference between the volume of the outer tubular member and the volume of the cylindrical members.

15 Claims, 4 Drawing Figures

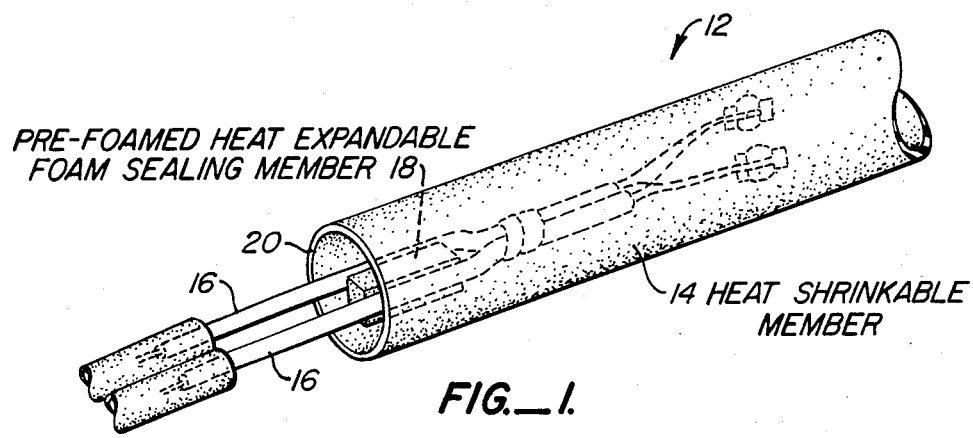
FIG._1.
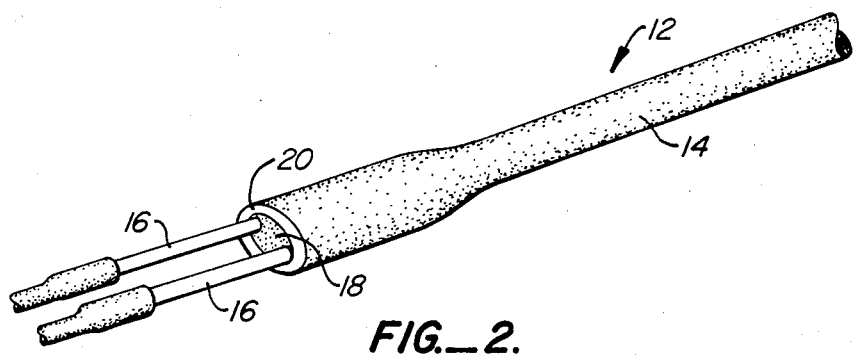
FIG._2.
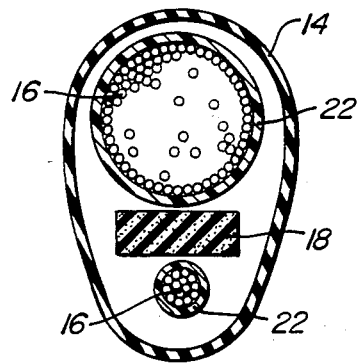
FIG._3.
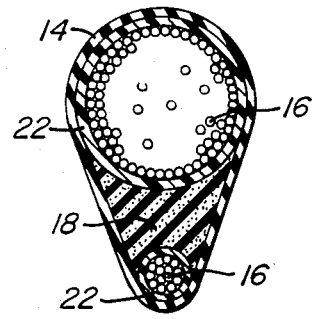
FIG._4.

ARTICLE HAVING HEAT EXPANDABLE SEALING MEMBER

TECHNICAL FIELD

This invention relates to electrical wire conduits and more particularly, to an electrical wire conduit having a heat expandable sealing member.

BACKGROUND ART

Electrical wire conduits utilizing heat shrinkable articles are common in the art. When the exit of an electrical wire conduit which has only a single electrical wire in it is to be closed, a heat shrinkable tube or outer sleeve can be used successfully to close that exit. When two electrical wires are exiting from an outer sleeve, however, the heat shrinkable outer sleeve is incapable of closing the exit entirely. Thus, the prior art discloses numerous techniques to close such gaps in these exits. One method is to wrap each exiting electrical wire with some sort of a mastic sealing compound in sufficient quantity as to fill any gaps created by the exiting wires as they emerge from the opened end of the heat shrinkable sleeve. Another method, as disclosed in U.S. Pat. No. 4,298,415, is the use of a three-prong clip positioned at the branch of these exiting wires. A third method, as disclosed in German Offenlegungsschrift No. 24 13 623, is the use of a shaped, non-metallic spacer that is inserted between the exiting wires.

These prior art techniques contain inherent and obvious disadvantages. The three-prong clip, generally made of metallic material, enhances the likelihood of overheating during the shrinking operation. Such overheating either damages the outer sleeve or causes the clip to penetrate the sleeve, introducing the possibility of corrosion when the entire conduit is buried in moist ground or immersed in water. Moreover, closure by mechanical means cannot possibly and effectively prevent the entry of corrosive elements such as moisture into the cable. The shaped, non-metallic spacer requires accurate sizing in order for it to fit between the exiting wires. Such sizing is both expensive and time consuming.

DISCLOSURE OF THE INVENTION

In view of the deficiencies in the prior art, it is a major object of the present invention to provide a novel electrical wire conduit having a heat expandable foam sealing member.

It is another object of the present invention to provide a novel electrical wire conduit having a heat expandable foam sealing member that does not corrode the electrical wires.

It is a further object of the present invention to provide a novel electrical wire conduit having a heat expandable foam sealing member that does not enhance the likelihood of corrosion.

It is a still further object of the present invention to provide a novel electrical wire conduit having a heat expandable foam sealing member that is easy to install.

In order to accomplish the above and still further objects, the present invention provides an electrical wire conduit that comprises a generally axially extending outer tube, a plurality of generally axially extending electrical wires, and a heat expandable foam sealing member.

More particularly, the outer tube has at least one opening and occupies a predetermined volume. Each of the electrical wires is received in the outer tube in an axially extending, parallel fashion such that the wires occupy a volume that is less than the volume of the outer tube. The sealing member, capable of sealing the outer tube opening, occupies a volume that is generally equal to the difference between the outer tube volume and the volume of the wires. In the preferred embodiment, the heat expandable foam sealing member comprises a cross-linked polymer of the polyolefin family. Moreover, the sealing member comprises substantially closed cells.

One advantage of the present invention is that the heat expandable foam sealing member does not corrode the electrical wires.

Another advantage of the present invention is that the heat expandable foam sealing member does not enhance the likelihood of corrosion.

A further advantage of the present invention is that the electrical wire conduit having the heat expandable foam sealing member is both inexpensive and easy to manufacture.

Other objects, features, and advantages of the present invention will appear from the following detailed description of the best mode of a preferred embodiment, taken together with the accompanying drawing.

BRIEF DESCRIPTION OF THE DRAWINGS

FIG. 1 is a partial perspective view of the novel electrical wire conduit of the present invention with the novel heat expandable foam sealing member before heating;

FIG. 2 is a partial perspective view of the novel electrical wire conduit with the novel heat expandable foam sealing member after heating, closing the opening;

FIG. 3 is an examplary cross-section view of the novel electrical wire conduit of the present invention with the novel heat expandable foam sealing member before heating; and FIG. 4 is an exemplary cross-section view of the novel electrical wire conduit of the present invention with novel heat expandable foam sealing member after heating, closing the opening.

BEST MODE FOR CARRYING OUT THE INVENTION

Referring to FIG. 1, there is shown an electrical wire conduit, generally designated 12. Conduit 12 comprises a generally axially extending outer tube or sleeve 14, a plurality of generally axially extending electrical wires 16, and at least one heat expandable foam sealing member 18.

More particularly, outer sleeve 14 has at least one opening 20 and occupies a predetermined volume. Electrical wires 16, each of which being received in outer sleeve 14 in an axially extending, parallel fashion, occupy a volume that is less than the volume of outer sleeve 14, as best shown in FIG. 3. Although outer sleeve 14 may envelop bare electrical wires 16, as shown in FIGS. 1 and 2, it is within the skills of those skilled in the art to envelop bundles of wires 16, as best shown in FIGS. 3 and 4. Each bundle of wire 16 includes an outer covering or tube 22 which is made from suitable material.

Sealing member 18, capable of sealing opening 20 of outer sleeve 14, is shown in its compressed, pre-heating condition in FIGS. 1 and 3. While in this condition, sealing member 18 occupies a volume that is less than the difference between the volume of outer sleeve 14 and the volume of wires 16. After heating, sealing member 18 then occupies a volume that is generally equal to the difference between the volume of outer sleeve 14 and the volume of wires 16, as best shown in FIG. 4.

Although sealing member 18 in the preferred embodiment comprises a pre-foamed cross-linked polymer of the polyolefin family, sealing member 18 may be any polymeric foam material that has the characteristics of being compressible during an initial stage and expandable during a second, heating stage. Sealing member 18 was first compressed and then cooled while in the compressed condition. Such compression could be in either one or two directions. If sealing member 18 was compressed in one direction, e.g., the negative X-axis direction, then expansion during heating would be in the positive X-axis direction. If compressed in both the negative X and Y-axes directions, then it would expand in the positive X and Y-axes directions. Polymers of the polyolefin family include polyethylene, ethylene vinyl acetate copolymer, ethylene ethyl acrylate copolymer, ethylene propylene rubber, and ethylene propylene dienne monomer rubber. Other material such as polyvinylchloride, polyurethane, and silicone rubber, may be used.

Sealing member 18 in the preferred embodiment also comprises substantially closed cells. Such closed cells, not shown, prevent the entry of moisture or other corrosive elements into electrical wire conduit 12. If sealing member 18 is made from closed cell foams, such closed cell foams may be used only after it had been stored for an extended period of time in order for it to be capable of expanding completely during the heat expansion stage. The density of foam sealing member 18 is not critical to the operation of the invention. Lower density foam naturally allow far more compression and have an higher expansion ratio, enabling such lower density foams to fill larger voids between electrical wires.

To improve the reliability of sealing member 18, sealing member 18 may be coated with a hot melt adhesive that, upon heating, will melt and bond electrical wires 16 and outer sleeve 14. Such adhesive, not shown, should have a melting temperature that is comparable to the melting temperature of foam extending member 18. Adhesive 22 may comprise polyamide, ethylene vinyl acetate, and butyl-based adhesives.

Outer sleeve 14 in the preferred embodiment comprises a conventional heat shrinkable material.

In fabricating the novel electrical wire conduit 12, a heat shrinkable outer sleeve 14 is selected. Outer sleeve 14 has at least one opening 20, and has a predetermined volume. Two electrical wires 16, each being 7 mm in diameter, are positioned within outer sleeve 14. A rectangular foam seal member 18, which has a dimension of 30 mm×5 mm×10 mm, is positioned between the two electrical wires 16 adjacent opening 20. An adhesive layer, not shown, is also positioned between wires 16 and outer sleeve 14, the adhesive layer being 25 mil in thickness.

Heat is then applied to electrical wire conduit 12 in a conventional manner and at conventional temperatures. Heat shrinkable outer sleeve 14 contracts toward its axis in a conventional fashion. Heat expansion foam sealing member 18 simultaneously expands to seal opening 20, as best shown in FIG. 4. After heating, sealing member 18 occupies a volume that is generally equal to the difference between the outer tube volume and volume of electrical wires 16.

It will be apparent to those skilled in the art that various modifications may be made within the spirit of the invention and the scope of the appended claims.

We claim:

1. An article, comprising
   a generally axially extended outer, tubular member having at least one open terminus, said outer tubular member occupying a predetermined volume;
   a plurality of generally axially extending cylindrical members, each of said cylindrical members being received in said tubular member in an axially extending, parallel fashion such that said cylindrical members occupy a volume that is less than said outer tubular member volume; and
   at least one pre-foamed, heat expandable foam sealing member, said sealing member being capable of sealing said open terminus of said outer tubular member, and occupying a volume that is generally equal to the difference between said outer tubular member volume and said volume of said cylindrical members, wherein said heat expandable foam sealing member comprises a crosslinked polymer having the characteristics of being compressible during an initial stage and expandable during a second, heating stage.

2. An article, comprising
   a generally axially extended outer, tubular member having at least one open terminus, said outer tubular member occupying a predetermined volume;
   a plurality of generally axially extending cylindrical members, each of said cylindrical members being received in said tubular member in an axially extending, parallel fashion such that said cylindrical members occupy a volume that is less than said outer tubular member volume; and
   at least one pre-foamed, heat expandable foam sealing member, said sealing member being capable of sealing said open terminus of said outer tubular member, and occupying a volume that is generally equal to the difference between said outer tubular member volume and said volume of said cylindrical members, wherein said heat expandable foam sealing member comprises a crosslink polymer of the polyolefin family having the characteristics of being compressible during an initial stage and expandable during a second, heating stage.

3. An article, comprising
   a generally axially extended outer, tubular member having at least one open terminus, said outer tubular member occupying a predetermined volume;
   a plurality of generally axially extending cylindrical members, each of said cylindrical members being received in said tubular member in an axially extending, parallel fashion such that said cylindrical members occupy a volume that is less than said outer tubular member volume; and
   at least one pre-foamed, heat expandable foam sealing member, said sealing member being capable of sealing said open terminus of said outer tubular member, and occupying a volume that is generally equal to the difference between said outer tubular member volume and said volume of said cylindrical members, wherein said heat expandable foam sealing member comprises a polymeric foam having the characteristics of being compressible during an initial stage and expandable during a second, heating stage, and further wherein said outer, tubular member is a heat shrinkable member, the heat shrinking temperature of said heat shrinkable member being such that the heat used to cause said heat shrinkable member to shrink will cause said heat expandable foam member to expand.

4. An electrical wire assembly, comprising
a generally axially extending outer, tube having at least one open terminus, said outer tube occupying a predetermined volume;
a plurality of generally axially extending electrical wires, each of said electrical wires being received in said outer tube in an axially extending, parallel fasion such that said wires occupy a volume that is less than said outer tube volume; and
at least one pre-foamed, heat expandable foam sealing member, said sealing member being capable of sealing said open terminus of said outer tube, and occupying a volume that is generally equal to the difference between said outer tube volume and said volume of said wires, wherein said heat expandable foam sealing member comprises a cross-linked polymer having the characteristics of being compressible during an initial stage and expandable during a second, heating stage.

5. The electrical wire assembly as claimed in claim 4, wherein said heat expandable foam sealing member is a cross-linked polymer of the polyolefin family.

6. The electrical wire assembly as claimed in claim 4, wherein said heat expandable foam sealing member is a polyethylene polymer.

7. The electrical wire assembly as claimed in claim 4, wherein said heat expandable foam sealing member is an ethylene vinyl acetate copolymer.

8. The electrical wire assembly as claimed in claim 4, wherein said heat expandable foam sealing member is an ethylene ethyl acrylate copolymer.

9. The electrical wire assembly as claimed in claim 4, wherein said heat expandable foam sealing member is an ethylene propylene rubber.

10. The electrical wire assembly as claimed in claim 4, wherein said heat expandable foam sealing member is an ethylene propylene dienne monomer rubber.

11. The electrical wire assembly as claimed in claim 4, wherein said heat expandable foam sealing member is a polyvinylchloride.

12. The electrical wire assembly as claimed in claim 4, wherein said heat expandable foam sealing member is a polyurethane polymer.

13. The electrical wire assembly as claimed in claim 4, wherein said heat expandable foam sealing member is a silicone rubber.

14. The electrical wire assembly as claimed in claim 4, 5, 6, 7, 8, 9, 10, 11, 12 or 13, wherein said heat expandable foam sealing member comprises substantially closed cells.

15. The electrical wire assembly as claimed in claim 4, wherein said outer, tubular member is a heat shrinkable member, the heat shrinking temperature of said heat shrinkable member being such that the heat used to cause said heat shrinkable member to shrink will cause said heat expandable foam member to expand.

* * * * *